Patented Apr. 9, 1929.

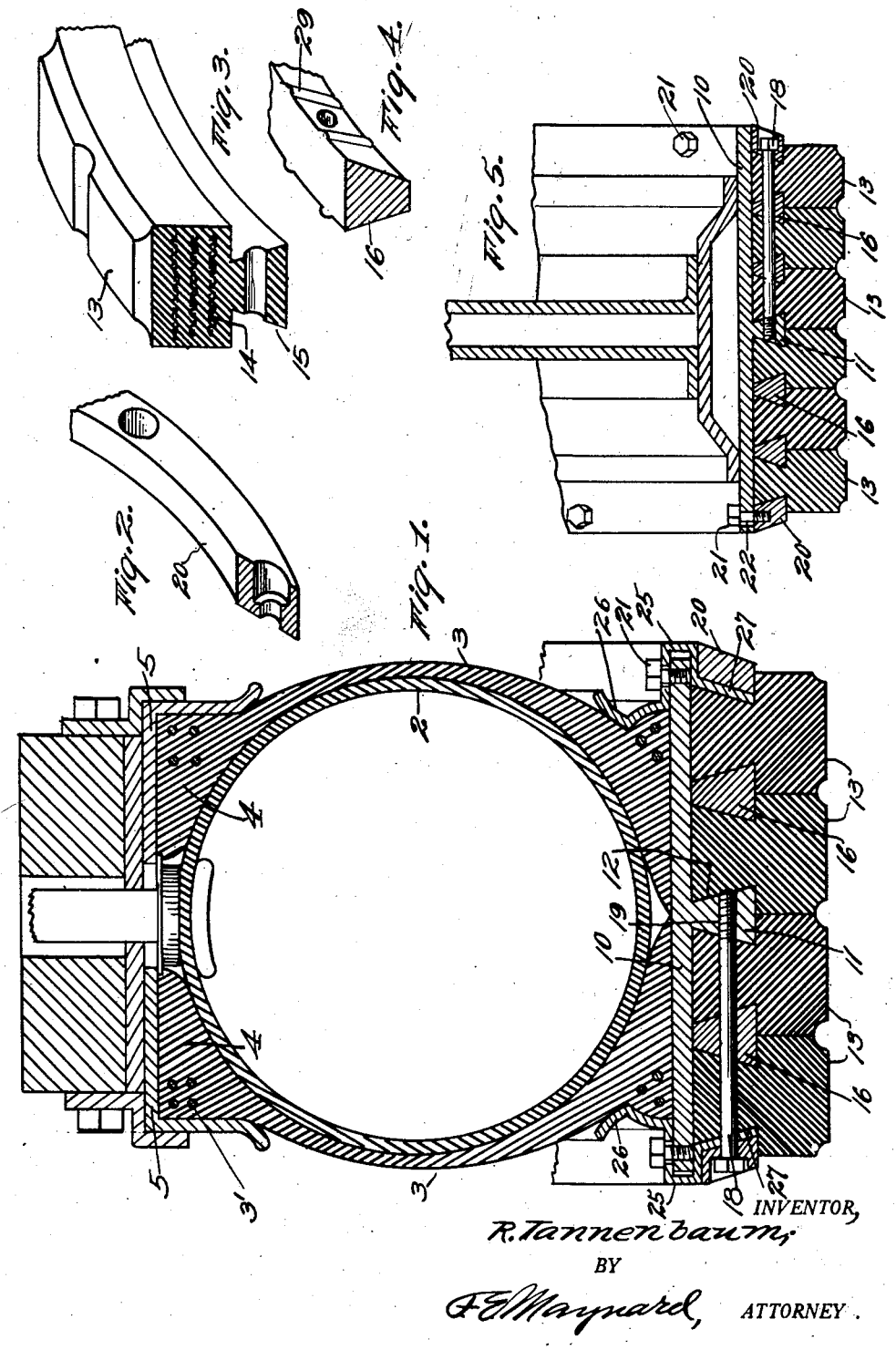

1,708,339

UNITED STATES PATENT OFFICE.

ROBERT TANNENBAUM, OF LOS ANGELES, CALIFORNIA.

RENEWABLE-TREAD CUSHION TIRE.

Application filed October 26, 1927. Serial No. 228,857.

This invention relates to wheels and particularly to a cushion tread for wheels.

An object of my present invention is to provide a built-on cushion tread which may be used with pneumatic cushion tubes or without them, as for some types of truck wheels.

Another object is to provide a built-on system of tread bands of rubber and in which each band constitutes an interchangeable unit of a series any or all of which may be readily removed for repairs or for replacement by new bands.

A further object is to provide a sectional tread of few and simple parts of light weight and substantial form and enabling replacement at any time and place without necessity of loss of much time, without removal of the rim or of the wheel, and by the use of simple kit tools.

There are other objects, advantages and features of construction, combination and details of means as will be made manifest in the following specification of the herewith illustrative embodiment; it being understood that modifications, variations and adaptations may be resorted to within the spirit, scope and principle of the invention as it is more directly claimed hereinafter.

Figure 1 is a cross-section of a wheel rim and a tube, and of the built-on tread.

Figure 2 is a perspective of a fragment of a jamb ring.

Figure 3 is a perspective of a fragment of a rubber tread unit.

Figure 4 is a perspective of a fragment of an intermediate key ring.

Figure 5 is a sectional detail of the tread built on a tubeless, truck wheel rim.

The present tread is designed to be applied to wheels with which may be combined a suitable cushioning device a form of which is here shown as including an inner, inflatable tube 2 flanked by separable side walls 3—3 having inner beads 4—4 embraced by a suitable wheel rim 5.

The tread structure includes a stout tread rim 10 of cylindrical form and having a fixed, central, peripheral key flange 11 with overhanging sides of dove-tail or equivalent section indicated at 12. Duplicate, interchangeable tread units 13 consisting of heavy bands of rubber which may be reinforced by fabric 14, have undercut inner corners 15 and these match with the side walls 12 of the fixed key flange 11. The intermediate units 13 are pressed solidly against the key flange 11 by contiguous key rings 16 which have a cross-section similar to the flange 11.
The applied rubber tread units 13 cover up the flange 11 and the intermediate key rings 16 and they are pressed firmly together by means of strong clamping bolts 18 whose inner ends screw into holes 19 in the fixed flange or key 11.

In Fig. 5 the bolts 18 pass through detachable, side, jamb rings 20 and through the mounted tread band units 13 on the respective side of the flange 11. These jambs 20 compress the interposed bands 13 together and against their supporting and keying rings 16 and the flange 11. In this form the jambs 20 are held against peripheral sliding action by stop screws 21 which pass through cross slots 22 in the tread rim 10; these screws therefore taking much of the strains that would otherwise be imposed on the clamping bolts 18.

When the tread rim 10 is supported on and by an inner tube, as in Fig. 1, side clinching hoops 25 are telescoped on the side edges of the rim 10. The hoops have inner lips 26 to engage and support the side walls 3 of the tube casing. The screws 21 pass through cross slots in the hoops and hold these against rotation on the tread rim 10. In this form of the device the hoops have key fins 27 to lie against the near faces of band units 13 and the applied jambs 20 rest against the fins 27; the bolts 18 passing through the jambs and through the fins, and through the interposed bands units 13, key rings 16 and into the fixed flange 11.

Those elements against which the undercut corners 15 are pressed and thereby keyed may be suitably corrugated as at 29 to afford a firm bite and so prevent the rubber band units 13 from slipping and from pulling out from between the suitably spaced bolts 18, which latter are staggered on opposite sides of the middle, fixed, rim flange 11.

The separable side walls 3 have their beads reinforced by wire strands 3' which serve to stiffen the beads and to hold them to place in between the rim parts. Either of the side walls 3 may be removed by first dismounting their respective retaining side rim lips and flanges. When a side wall has been removed then the inner tube can be taken off the rim.

The invention claimed is:

A wheel tire structure including a main rim having a fixed, central anchoring flange of dove-tail cross section, outermost jamb rings laterally slidable on to the rim, means engaging the jambs to secure them against rotation on the rim, intermediate floating dove-tail action key rings disposed on the rim between the central anchoring flange and the side jambs, groups of rubber band tread units of T-shape cross section having their narrow bodies clinched between the jambs, the rings and the fixed flange, and their tread bodies touching side to side over the holding rings and flanges, and screws passing through respective jamb rings and the tire units and floating keys and screwing into the central anchor, to retain the jambs against outward movement and compressing the holding parts and tire units into firm interlock; the screws on either side of the anchoring flange being removable to free their band units without disturbing those on the opposite side.

ROBT. TANNENBAUM.